Jan. 6, 1925.
A. O. AUSTIN
1,521,743
INSULATOR
Filed Dec. 6, 1920
7 Sheets-Sheet 4
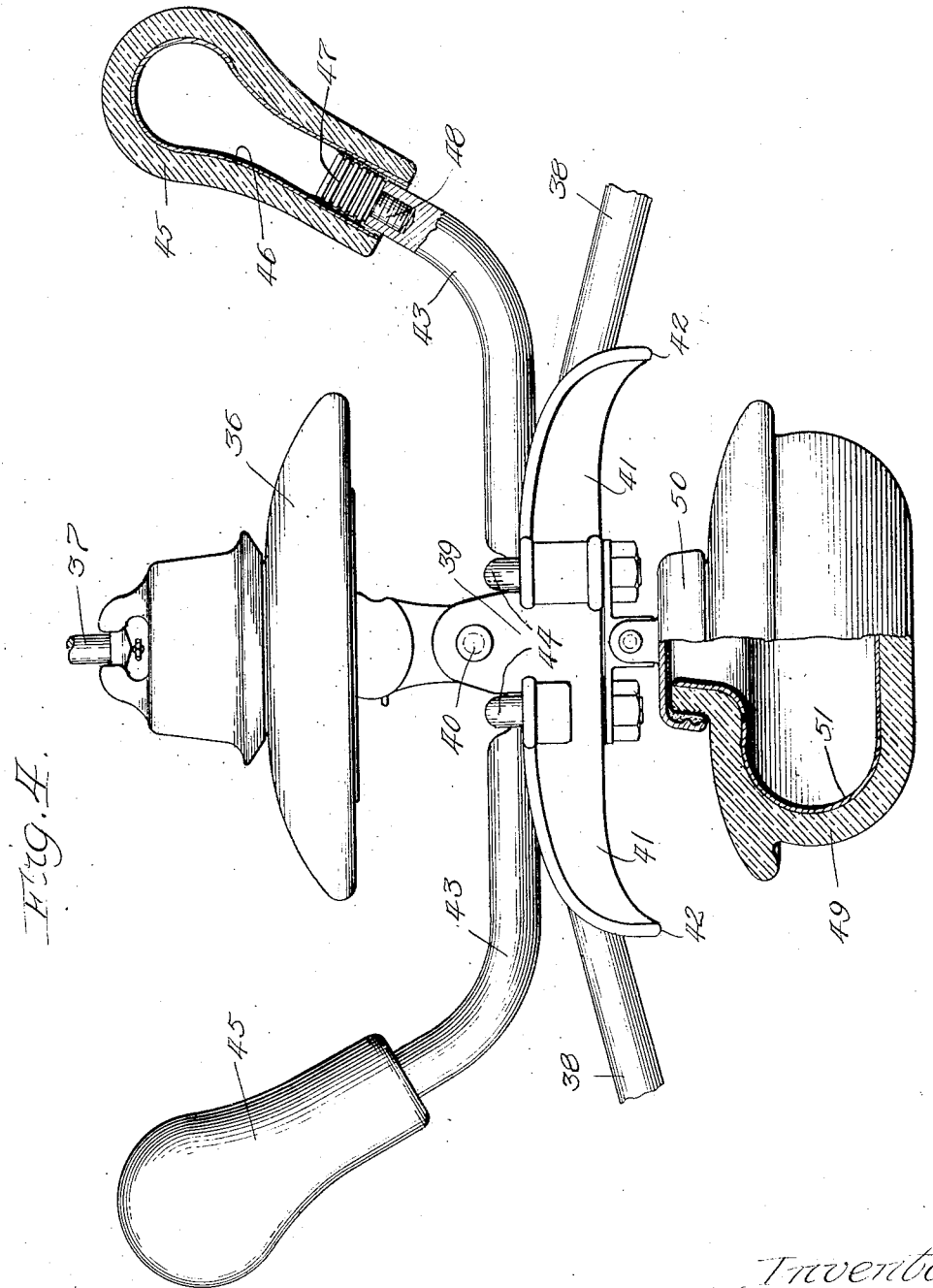

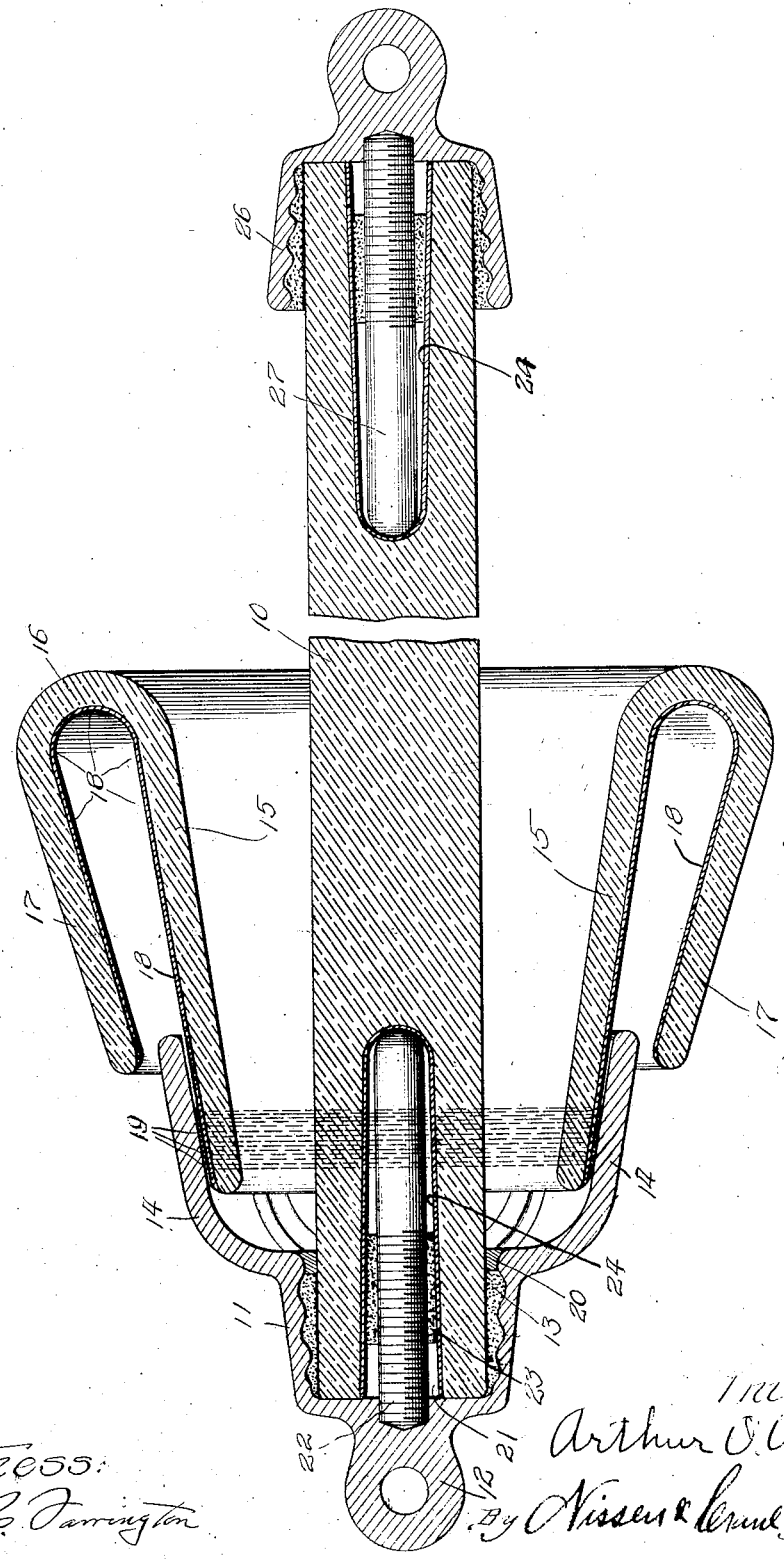

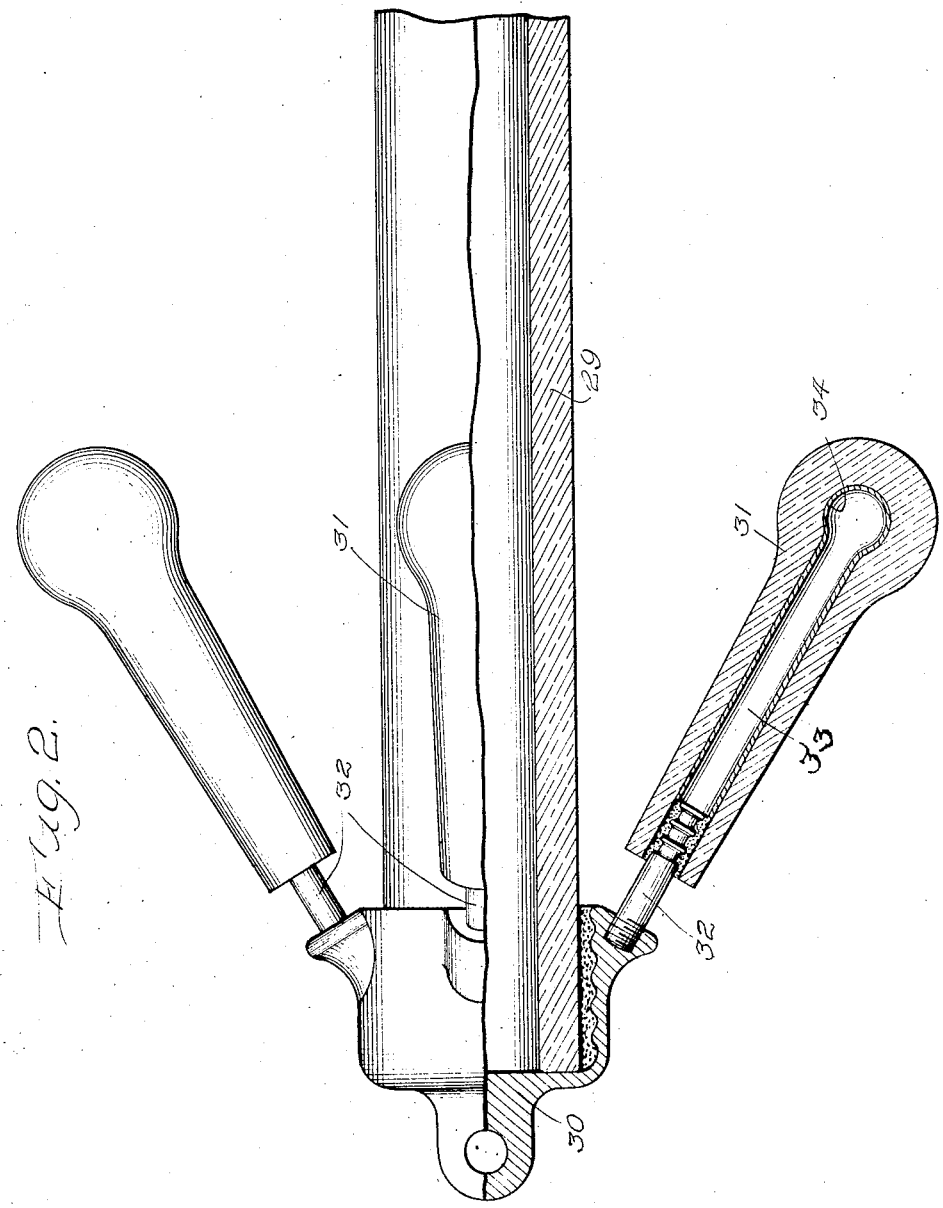

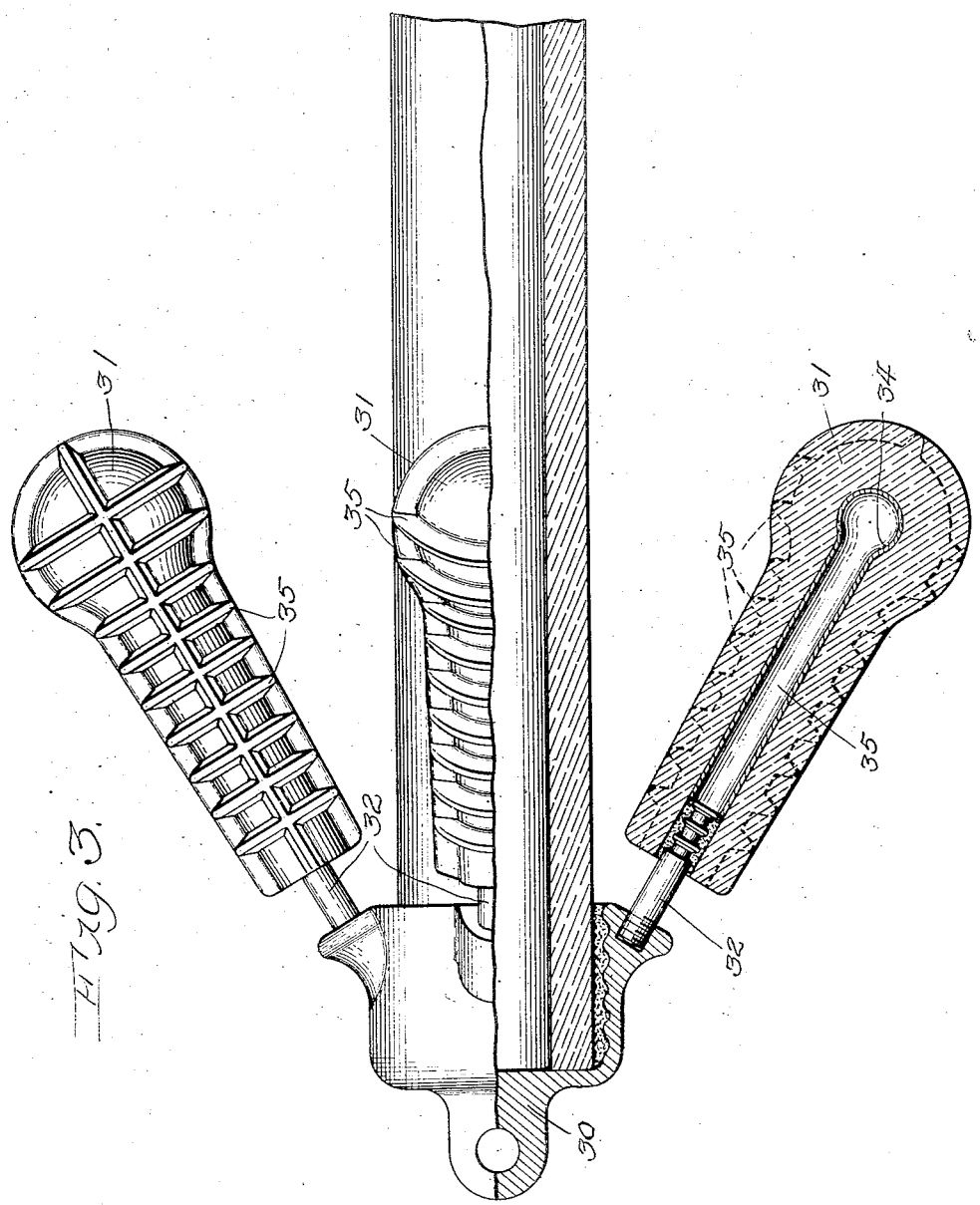

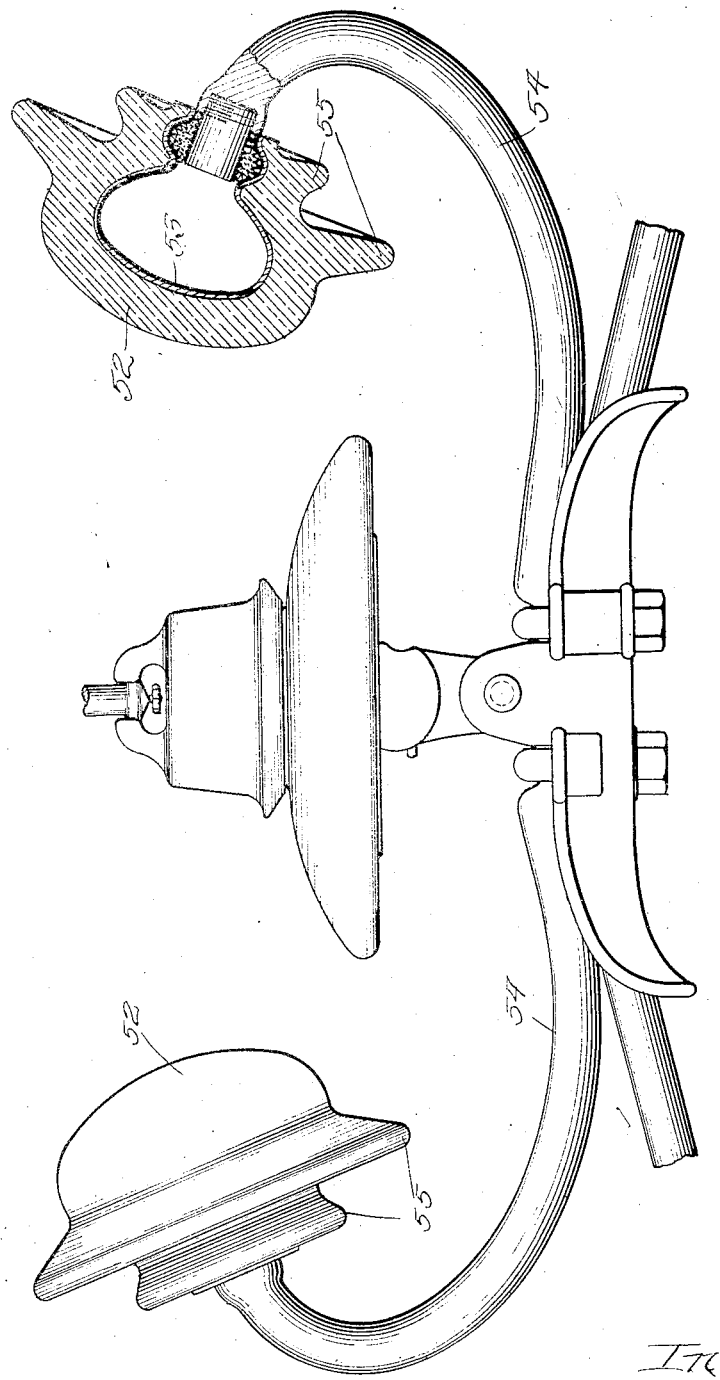

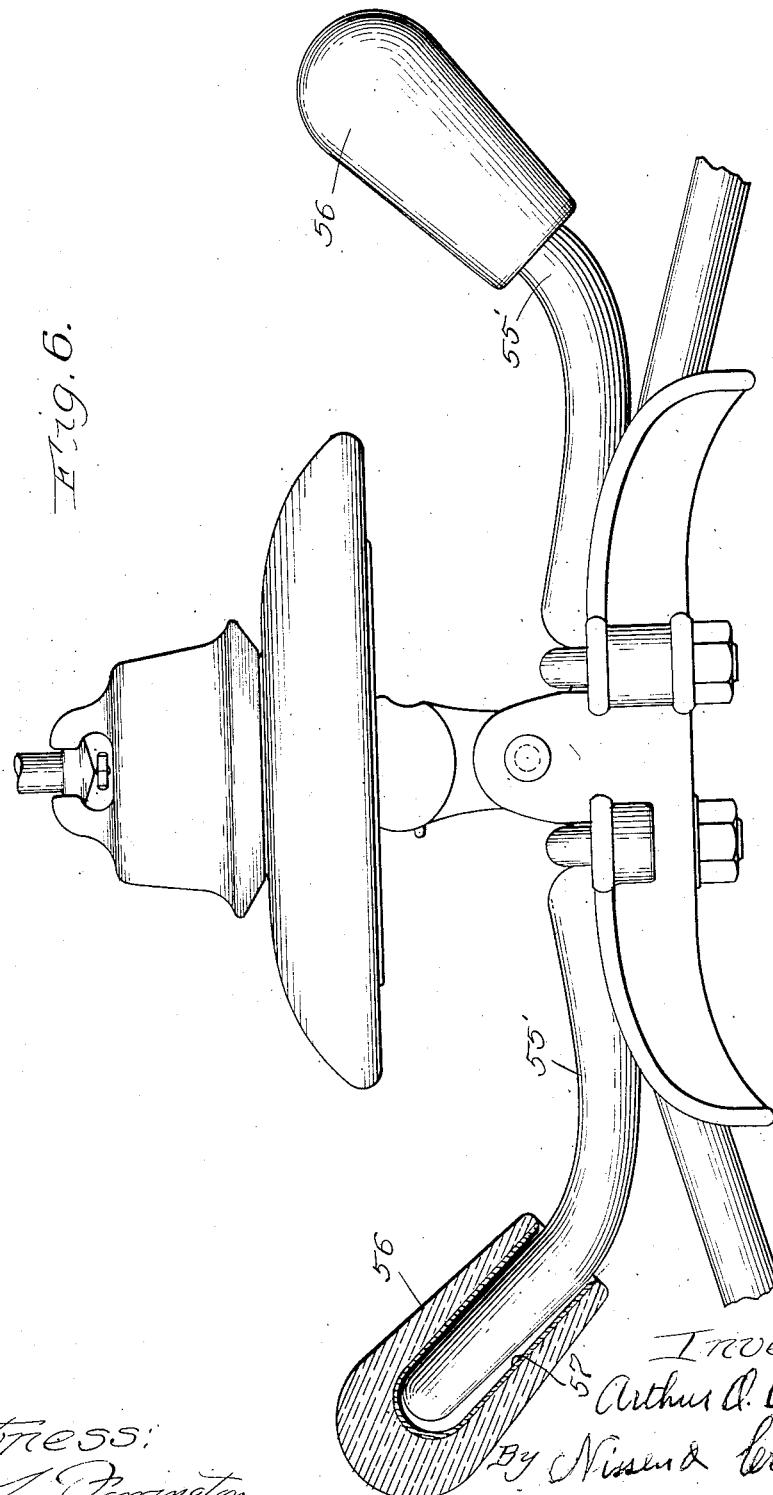

Jan. 6, 1925.
A. O. AUSTIN
INSULATOR
Filed Dec. 6, 1920
1,521,743
7 Sheets-Sheet 7
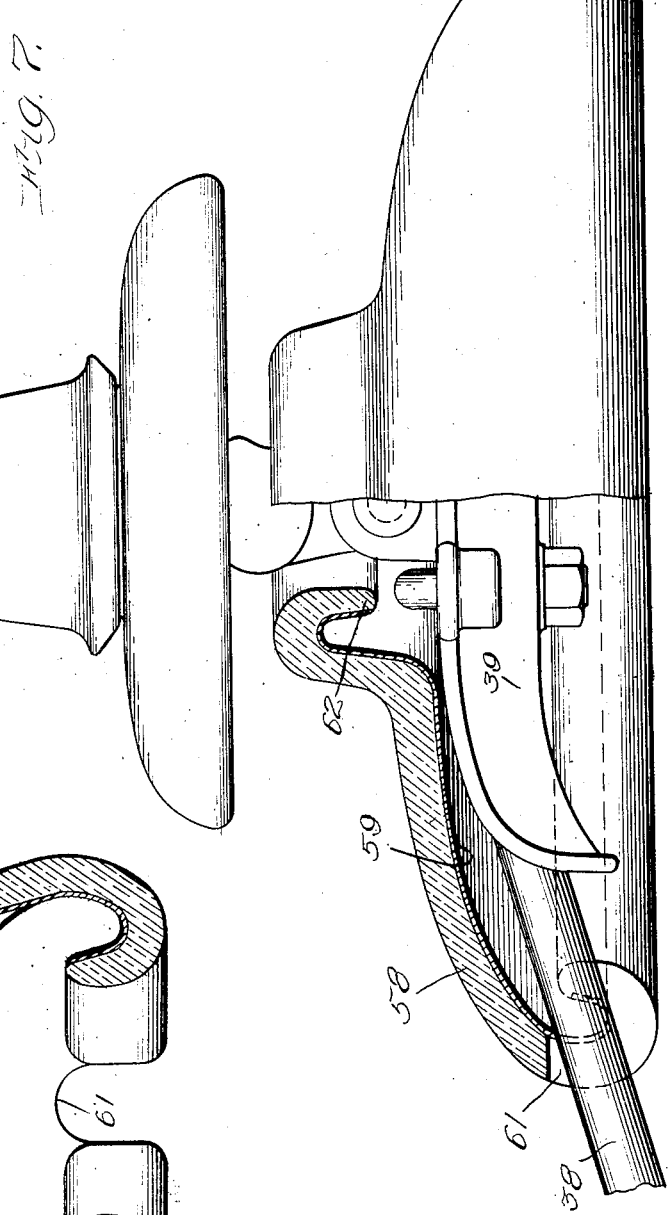
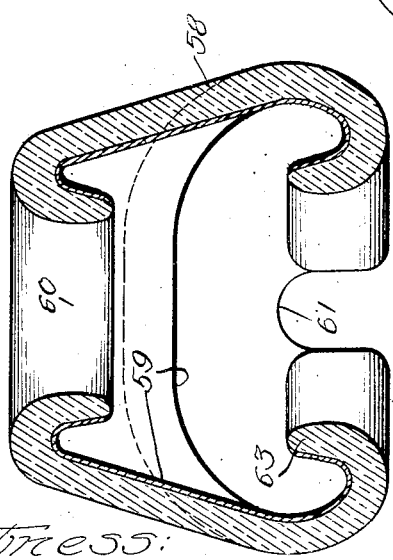

Patented Jan. 6, 1925.

1,521,743

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

INSULATOR.

Application filed December 6, 1920. Serial No. 428,438.

*To all whom it may concern:*

Be it known that I, ARTHUR O. AUSTIN, a citizen of the United States, residing at Barberton, in the county of Summit and State of Ohio, have invented certain new and useful Improvements in Insulators, of which the following is a specification.

This invention relates to electrical insulators, and especially to insulators for high voltages, and has for its object improved distribution of electrostatic flux and the provision of insulators which shall be of improved construction and operation.

The invention is exemplified in the combination and arrangement of parts shown in the accompanying drawings and described in the following specification, and it is more particularly pointed out in the appended claims.

In the drawings—

Fig. 1 is a vertical sectional view of an insulator embodying one form of the present invention;

Fig. 2 is an elevation of one end of an insulator partly in section showing a somewhat different form of the invention;

Fig. 3 is a view similar to Fig. 2 but showing a different modification;

Fig. 4 is an elevation with parts in section showing one method of applying the invention to suspension insulators in series;

Figs. 5, 6 and 7 are views similar to Fig. 4 showing different applications of the invention to series suspension insulators; and Fig. 8 is a transverse section of the screening member shown in Fig. 7.

In high tension insulators where two conductors of different potentials are separated from one another by an insulating member, it is well known that an electrostatic field is present in which the lines of force extend through the insulator and the surrounding medium from one of the conductors to the other. Other conditions being equal these lines of force are most closely concentrated at the portions of the insulated conductors which are nearest to one another. The lines of force also concentrate at restricted projections or points formed upon the conductors.

When insulators or dielectrics are worked at high pressures or potentials the resulting high electrostatic density may set up a stress of such magnitude that it will damage the dielectric. This stress may be set up around a conductor imbedded in a solid dielectric or around a conducting surface which operates in a medium, such as air, oil, wax, or other medium. When the conducting surface operates in air, corona or brush discharge may occur at a fairly low voltage, particularly where the conductor has a sharp edge or point. If corona or brush discharge occurs at normal frequency, say 60 cycles, and an electrical stress at high frequency is impressed on the electrodes, the current will be increased in the streamer or brush discharge. Since the resistance of the streamer drops off very rapidly with an increase in the current it is seen that where the frequency is high the current may be very materially increased. This increase in current lowers the resistance in the streamer permitting the streamer to flow out further from the electrode. This increase in distance increases the capacitance of the streamer and permits more current to flow. The increased current in turn still further lowers the resistance in the streamer so that it extends still further. Where a persistent wave at high frequency is applied, such as in wireless work, a comparatively small voltage will cause the streamer to build out several feet once it is started. This streamer may arc to ground or absorb considerable energy or damage any insulator which may be near the surface which discharges.

In wireless work where a high frequency generator is used, or the equivalent, the point of brush discharge from a conducting surface limits the voltage which may be used. If this discharging surface is covered by a dielectric having greater strength than the air, it will be possible to operate at a higher voltage or stress, since a streamer, which will grow to serious proportions, is prevented. It will be seen that where this is the condition and a strong dielectric is used to cover the surface which has greatest tendency to discharge, a higher operating voltage may be used.

If a conducting surface has a tendency to discharge, the bringing of another surface charged with the same potential near will screen the first surface or reduce part of the concentration of stress. The added surface forms a parallel path or circuit for the electrostatic flux and hence reduces the amount of flux emanating from the original surface. Where the screening surface is insulated it may be placed in a stronger field without danger of discharging. This will permit it to be so placed that it will greatly reduce the concentration of flux from some uninsulated surface. This insulated screen or shield may be effectively used to set up a better electrical gradient in the insulator or surrounding medium and permits operation at a higher potential without setting up streamers on the metal parts of an insulator or a charged surface with which it is used.

The above is applicable to high tension lines for there is often a strong tendency for the line to arc to ground at the insulator. This tendency to arc is greatly aggravated by surges on the system produced by resonant arcing ground, switching surge, poor wave form or electrical discharge, such as lightning. Any condition such as those named above that produces a high voltage wave or series of waves in the line will, of course, increase the tendency to arcing at the time of increased voltage. The starting up or slowing down of a generator excited and connected to a parallel circuit may set up a resonant condition and cause arcing of insulators from streamers which develop in the manner described.

In Fig. 1 the numeral 10 designates an insulator which may be a simple bar, or which may be of any cross-sectional shape, which working conditions require. To one end of the insulator 10 is secured a cap 11 provided with a supporting ring 12 and connect to the end of the insulator by cement 13. The cap 11 is provided with a number of arms 14 extending toward the opposite end of the insulator and arranged to carry a shield of insulating material 15. The shield 15 is turned backwardly at 16 providing a rearwardly extending fold 17, and the surface of the insulator within the backwardly turned portion is plated with a coating of conducting material, as indicated at 18. The plating 18 extends backwardly along the shield 15 and is electrically connected with the arms 14 and the cap 11 by a winding of metal wire 19 interposed between the shield 15 and the arms 14 for securing the shield in place within the arms. It will thus be seen that the plating 18 is electrically connected with the conductor secured to the end of the insulator, and that the foremost portion of the plating 18 being the nearest to the opposite conductor will constitute the source from which the greatest number of electrostatic lines of force will emanate toward the conductor at the opposite end of the insulator. It will be apparent that these lines of force must pass through the dielectric material of which the shield 15 is composed, and since this material is of greater dielectric strength than the surrounding medium, the shield 15 will offer an effective resistance to any tendency to flashover along the lines of force of the concentrated electrostatic field. The plating 18 also provides an extended smoothly curved surface so that there are no points to cause a concentration of the electrostatic flux. It is sometimes desirable to provide a filling of conducting material between the front edge of the end cap 11 and insulator 10, as shown at 20. This will protect the cement 13 from any leakage currents between the cap and the surface of the insulator.

The end of the insulator is provided with a longitudinally extending opening 21 into which a pin 22 connected with the cap 11 projects. The pin 22 may be secured to the interior of the opening 21 by cement 23 to form a supplemental interior connection between the cap and the insulator. The end of the pin 22 constitutes a radiating point for the electrostatic flux, which like the plating 18 is surrounded by an insulating medium of greater dielectric strength than that of the atmosphere. The inner surface of the opening 21 may be plated with a metallic coating 24 similar to the coating 18, and this coating should extend over the rounded surface at the inner end of the opening where it forms electrical contact with the end of the pin 22. The coating may also extend to the end of the insulator so that it forms contact with the end of the cap 11.

The opposite end of the insulator may be provided with a duplicate of the attachment described, or it may be equipped, as shown, with a simple cap 26 and an internal pin 27, similar to the pin 22.

In the form of the invention shown in Fig. 2 an insulator 29 is provided with an end cap 30 and a series of external flux distributing members 31. These members comprise supports 32 which carry the distributing members 31. The members 31 are composed of dielectric material having a central opening 33 internally coated with a metallic covering 34 from which the lines of force emanate. The coating 34 may be brought into direct contact with the support 32, or for high potential work the cement will afford sufficient conductivity between the two parts. It will be apparent that the covering 34 is surrounded with the insulating material of the member 31, so that any tendency to discharge along the lines of force emanating from the covering 34 is prevented by the insulating material. The external insulation of the shield or flux rod relieves the terminal portion of the insulating member for the flux rod of dangerous surface charging currents because of the resistance it offers to such currents and permits operation at high voltages. Where a construction of this kind is used a bug, raindrop or other projection is not so likely to cause a burr or arc to form on the insulator shield as would be the case if the surface of the shield were of conducting material. This is due to the fact that the insulation limits the surface currents. This is particularly important in radio insulators used on a persistent wave.

Fig. 3 shows an insulator similar to that of Fig. 2 with ribs 35 added to the members 31 to break up the surface into small sections and limit the charging current in case streamers start. The ribs keep down the charging current in the small streamers by cutting the surface up into small sections. Where streamers start the resistance decreases and the length of the streamers increases as the current increases. Limiting the current in any streamer is then of particular advantage.

In Fig. 4 there is shown one method of applying the invention to suspension insulators, such as are commonly used for carrying high tension transmission lines. The suspension insulators may be of any well-known type, one form being shown in my prior Patent No. 1,284,976, granted November 19, 1918. One of these insulators is shown at 36 and constitutes one of a series connected together by pins 37 in a well-known manner. The charged conductor or transmission line 38 is supported from the insulator 36 by a clamp 39 pivotally connected at 40 with the suspension member of the insulator 36. The clamp 39 is provided with a saddle 41 having downwardly extending ears 42 to provide a rounded support for the conductor 38 so that the conductor will not be supported over an abrupt edge. A pair of upwardly extending horns 43 are secured to the clamp 39 by J-bolts 44 and at the upper end of each horn 43 there is supported a flux distributing member comprising a hollow bulb 45 of dielectric material, the interior of the bulb being provided with a metallic coating 46. A plug 47 is cemented in the end of the bulb 45 and has a threaded connection 48 with the end of the horn 43. The coating 46 is in electrical contact with the plug 47 so that the conducting surface within the bulb is at the same potential as the conductor 38. This connection may be effected by a conducting cement or by other conducting means joining the two parts.

When a charged conductor is supported by a string of insulators in series it is well known that the fall of potential is not uniform throughout the series, but that there is a greater drop in the insulator adjacent the conductor than in insulators farther removed in the series. This is due to the fact that there is leakage of the static lines of force along the string of insulators so that the insulator adjacent the conductor carries a stronger field than insulators farther removed. In the form of the invention shown in Fig. 4 it will be apparent that flux will emanate from the surface 46, and because of the position of this charged surface, the flux emanating therefrom will be fed into the supporting string of insulators at points beyond the lowermost insulator of the string and leakage of flux from the lowermost insulator and connected conductor will be minimized. This will tend to equalize the flux distribution in the string of insulators and hence produce a better gradient in the string. The conducting surface 46 also acts in a manner similar to the surface 18 shown in Fig. 1 to screen the clamp 39 and the associated metallic parts and materially reducing the flux emanating from these parts and so decreasing the liability of corona or brush discharge or flashover from the metallic parts. Serious discharges from the screening surface 46 are prevented by the fact that the surface is heavily insulated by the dielectric member 45.

Mechanical requirements make it necessary to provide restricted projections on the support for the conductor 38, such as the point 42 and the ends of the holding bolts and where the conductor 38 is maintained at high potential, and especially where a high frequency is employed there is a tendency toward discharge to ground from any restricted points on the metallic support. To screen against such discharges a hollow member 49 of dielectric material may be suspended by a cap 50 beneath the clamp 39 and the interior of the member 49 is provided with a metallic coating 51 which extends over the edges of the dielectric member and contacts with the cap 50 so that the coating 51 will have the potential of the conductor 38. The coated surface 51 being farther removed from the conductor 38 than the parts of the supporting clamp the lines of force will be largely diverted from the projections on the clamp and will emanate from the coating 51, thus reducing the liability of discharge from the restricted points on the clamp and its connected parts. Serious discharge from the coating 51 is prevented by its covering of insulation in the manner previously explained. Practical tests and experiments have shown that where the holding portions of an insulator are screened in the manner shown the conductor may be worked at a very much higher potential without serious discharges than is possible where no screening elements are used.

In the modifications shown in Fig. 5 bulbs 52 of a somewhat different shape than those of the previously described figure are employed, the bulbs being brought in more closely to the supporting string to facilitate the feeding of flux to the insulators. Danger of discharge from the supporting horns 54 is obviated by the outwardly curved shape of the horns and by the flanges 55 on the dielectric member 52.

In place of the more elaborate constructions shown in Figs. 4 and 5 it has been found that very considerable reduction in the liability to discharge can be secured by simply upstanding horns, such as shown at 55' in Fig. 6, the ends of the horns being covered by a cup-shaped insulator member 56 provided with an internal metallic coating 57. The members 56 are simply set over the ends of the horns 55' so that the metallic coating 57 directly engages the horns. The coating 57 may be omitted under some conditions in which case the end of the horn serves the same purpose as a coating.

In Fig. 7 there is illustrated a screening member comprising a dielectric shield 58 having its internal surface coated with a metallic coating 59. The shield 58 is set in place so that it practically surrounds the supporting clamp for the conductor 38. An opening 60 is provided at the upper portion of the shield to accommodate the supporting member from the insulator and notches 61 may be provided for the conductor 38. It will be noted that the edges of the shield 58 are bent backwardly, as shown at 62 and 63, so that the edges of the metallic coating 59 will be insulated against discharge in the direction of lines of force emanating therefrom. It will be apparent that with this construction practically the entire static flux from the supporting clamp 39 and its connecting parts will emanate from the metallic coating 59, and since this coating is completely insulated by the shield 58, the danger of serious discharge along the lines of force is very materially decreased. The shield 58 in the drawings is illustrated as oblong to conform to the general shape of the clamp 39 but a circular shield may, of course, be employed, and various forms of mechanical support for the shield may be provided, if desired.

Where an uninsulated shield is placed between the clamp and the insulator, the insulation of the adjacent member is likely to be lowered by discharge from the shield to some portion of the insulating member or to the opposite electrode. Where the shield is insulated, as shown, the advantage of flux distribution of the shield may be gained without the disadvantage of having the insulation of a part of the series string lowered. Where the insulator of the parts of the string is maintained in this way it is seen that the shield or flux control may be worked much nearer to an insulating member without lowering its efficiency. The shield is, of course, more efficient as a flux control or screen when worked nearer a member into which it is desired to feed the flux than if further removed, as would be necessary if it were uninsulated.

I claim:—

1. An insulator comprising a dielectric member and mechanical holding means having a charged surface positioned within the electrostatic field about said dielectric member to reduce the electrostatic density in the operating medium adjacent the holding means, said charged surface being insulated to prevent discharge into the surrounding medium.

2. An insulator comprising a dielectric member having means for forming mechanical connection therewith, a flux distributing member extending to a position within the field of force emanating from said mechanical connecting means and beyond said mechanical connecting means, and a covering of dielectric material for said flux distributing member arranged at the side thereof away from said mechanical connecting means.

3. An insulator comprising a dielectric member, means for forming mechanical connection with said dielectric member, means extending away from said mechanical connecting means in the direction of said dielectric member for feeding electrostatic flux into said dielectric member at points spaced from said mechanical connecting means, and means for insulating the portion of said flux feeding means away from said mechanical connecting means to prevent electrical discharge therefrom.

4. An insulator comprising a dielectric member, a conductor having mechanical connection with said dielectric member, a flux distributor extending to a position within the electrostatic field surrounding the conductor beyond the mechanical connection between said conductor and dielectric member, and a cover of insulating material arranged to intercept lines of force emanating from said flux distributor in a direction away from said mechanical connection.

5. The combination with an insulating member, of a conductor having mechanical connection therewith, a flux distributing member arranged externally of said insulating member, and a dielectric covering arranged in the path of lines of force emanating from said flux distributing member at the side thereof away from said mechanical connection.

6. The combination with an insulating member, of a conductor having mechanical connection therewith, a flux distributing member having electrical connection with said conductor and arranged externally of said insulating member and extending beyond said conductor in the direction of the static field in the medium surrounding said conductor, and a dielectric covering for said flux distributing member arranged in the path of lines of force emanating therefrom.

7. The combination with an insulating member, of a conductor having mechanical connection therewith, and a device arranged externally of said insulating member and electrically connected with said conductor for diverting lines of force from the medium surrounding said conductor and for feeding lines of force to said insulating member at points removed from said conductor, said device comprising a conducting member and an insulator therefor arranged to intercept lines of force emanating from said conducting member.

8. The combination of an insulating member, a conductor having mechanical connection therewith, and an electro-static screen for said conductor comprising a dielectric member arranged externally of said insulating member, said dielectric member having a coating of conducting material electrically connected with said conductor and arranged on the side of said dielectric member opposite that from which the lines of force emanate into the surrounding medium.

9. The combination of an insulating member, a conductor having mechanical connection therewith, and an electrostatic screen for said conductor comprising a dielectric member having a coating of conducting material on one surface thereof.

10. The combination of an insulating member, a conductor having mechanical connection therewith, a flux distributing member comprising a dielectric member arranged externally of said insulating member, and a coating of conducting material on one face of said dielectric member, said coating being electrically connected with said conductor and positioned to feed flux to said insulator at points spaced from said conductor.

11. The combination with a series string of insulators, of means for mechanically connecting a conductor thereto, a flux distributor arranged externally of said insulator series in position to feed flux to said series beyond the insulator next adjacent said conductor, and insulating means for said flux distributor.

12. The combination with a series string of insulators, of means for mechanically connecting a conductor thereto, a flux distributor comprising an arm arranged externally of said series insulators and extending from said conductor in the direction of said series, and a covering of dielectric material for the end of said arm.

13. The combination with a plurality of insulators arranged in series, of a conductor mechanically supported by said insulators, and means for screening the mechanical support for said conductor comprising extensions connected with said support and having the outermost portions thereof covered with dielectric material arranged in the path of lines of force emanating therefrom.

14. The combination with a supporting insulator, a conductor, a mechanical connector for said insulator and conductor, of flux distributing means for said connector comprising a conducting surface arranged beyond said connector within the static field in the medium surrounding said connector, and a covering of dielectric material for said conducting surface.

15. The combination of a supporting insulator, a conductor, a mechanical connector for said insulator and conductor, and a flux screen for said connector comprising a dielectric plate having a metallic coating on one face thereof electrically connected with said connector, said coating being insulated by said plate against electrical discharge therefrom.

16. The combination with an insulator and a conductor connected thereto, of means for preventing electric discharge from said conductor comprising a member having a surface of conducting material extending from said conductor, and a dielectric member interposed in the path of the flux emanating from said surface to afford resistance to electric discharge along the lines of said flux.

17. The combination with an insulator and a conductor having mechanical connection therewith, of a flux distributing member having a screening surface of conducting material adjacent said conductor and electrically connected therewith but arranged within a stronger electrostatic field than the portion of said conductor forming the mechanical connection with said insulator, and a dielectric covering for said screening surface.

18. The combination with an insulator and a conductor secured thereto and having a portion of the surface thereof exposed to the medium in which said insulator is operated, of an electrostatic screen for preventing electrical discharge from said surface, said screen being arranged externally of said insulator and comprising a conducting surface electrically connected with said conductor and positioned beyond the exposed surface of said conductor in the direction of the lines of force emanating therefrom, and a dielectric covering for said screening surface.

19. The combination with an insulator and a conductor connected thereto and having a projection thereon the surface of which is exposed to the medium in which said insulator operates, of means for preventing concentration of static lines of force in the medium surrounding said projection, said means comprising a second projection connected with said conductor and arranged externally of said insulator, and a dielectric member arranged in the path of the static flux emanating from said second projection.

20. An insulator comprising a dielectric member having conductor fittings secured to opposite portions thereof, and a flux screen connected with one of said fittings and extending therefrom toward the other of said fittings adjacent said dielectric member, said screen comprising a conductor and a dielectric covering therefor, the covering being located on the side of said conductor toward said other fitting.

21. In combination, a pair of conductor fittings, insulating means for mechanically connecting said fittings, and a flux screen extending away from one of said fittings, said screen comprising a conductor and a cover of dielectric material positioned on the side of said conductor away from said fitting.

22. In combination, a pair of conductor fittings, insulating means for mechanically connecting said fittings together, and a flux screen electrically connected with one of said fittings and extending toward the other of said fittings beyond the mechanical connection between said first-mentioned fittings and said insulating means, said screen comprising a conductor member and a covering of dielectric material interposed between said conductor member and said second-mentioned fitting.

23. In combination, a pair of conductor fittings, insulating means mechanically connected with said fittings to transmit mechanical stress from one of said fittings to the other, and a flux screen electrically connected with one of said fittings and positioned externally of said insulating means, said flux screen comprising a conductor member and a covering of dielectric material for said conductor member arranged upon the surface of said conductor member away from the fitting to which said screen is connected and toward the other of said fittings.

24. The combination with a high potential conductor, of an insulator string for supporting said conductor, a metallic fitting for securing said conductor to said string, a metallic arm extending from said fitting into the field adjacent said insulator string, and a cap of dielectric material fitted over the end of said arm, said cap being hollow and having the interior thereof provided with a conductor coating.

25. The combination with a high potential conductor, of an insulator string for supporting said conductor, a metallic fitting for connecting said conductor to said string, said conductor extending in two directions from said fitting, a pair of metallic flux control arms connected with said fitting and extending therefrom into the field surrounding said insulator string, and caps of dielectric material supported on the ends of said control arms for preventing discharge from said arms.

26. The combination with a high potential conductor, of an insulator string for supporting said conductor, a metallic fitting for connecting said conductor to said string, said conductor extending in two directions from said fitting, a pair of metallic flux control arms connected with said fitting and extending therefrom into the field surrounding said insulator string, and caps of dielectric material supported on the ends of said control arms, said caps being hollow and having a coating of conducting material on the inner surface thereof.

27. The combination with a high potential conductor, of an insulator string for supporting said conductor, a metallic fitting for connecting said conductor to said string, said conductor extending in two directions from said fitting, a pair of metallic flux control arms connected with said fitting, and extending therefrom into the field surrounding said insulator string, caps of dielectric material supported on the ends of said arms, said caps being hollow and having a coating of conducting material on the inner surface thereof, and means for detachably securing said caps to the ends of said arms.

28. The combination with a conductor line, of a fitting for supporting said line, an insulator for supporting said fitting, flux control horns connected with said fitting and extending upwardly therefrom into the field adjacent said insulator, dielectric caps for covering the ends of said horns, and a flux control member suspended below said fitting, said member comprising a conducting surface and a covering of dielectric material therefor.

29. The combination with a high potential transmission line, of a metallic saddle for supporting said line intermediate its ends, an insulator for supporting said saddle, flux control horns connected with said saddle and extending therefrom substantially in the plane of the conductor line and projecting upwardly into the field adjacent said insulator, caps of dielectric material supported on the ends of said horns and having the interior surface thereof coated with a conducting medium, and a flux control member suspended from said saddle, said flux control member comprising a hollow dielectric body having the interior thereof coated with conducting material and electrically connected with said saddle.

30. The combination with a high potential transmission line, of a saddle for supporting said line intermediate the ends thereof, an insulator string for supporting said saddle, conductor horns secured to said saddle and extending therefrom substantially in the plane of said transmission line and projecting upwardly into the field adjacent said insulator string, hollow caps of dielectric material fitted over the ends of said horns and having a rounded exterior surface directed away from said horns, the inner surface of said caps being coated with conducting material electrically connected with said horns, and a flux control suspended below said saddle, said flux control member comprising a dielectric body provided with a circumferential petticoat and having its lower exterior face rounded, said body being hollow and internally coated with conducting material electrically connected with said saddle.

In testimony whereof I have signed my name to this specification on this 30th day of November, A. D. 1920.

ARTHUR O. AUSTIN.